E. H. HARRY.
CLEANING DEVICE.
APPLICATION FILED DEC. 2, 1918.
1,299,181.
Patented Apr. 1, 1919.
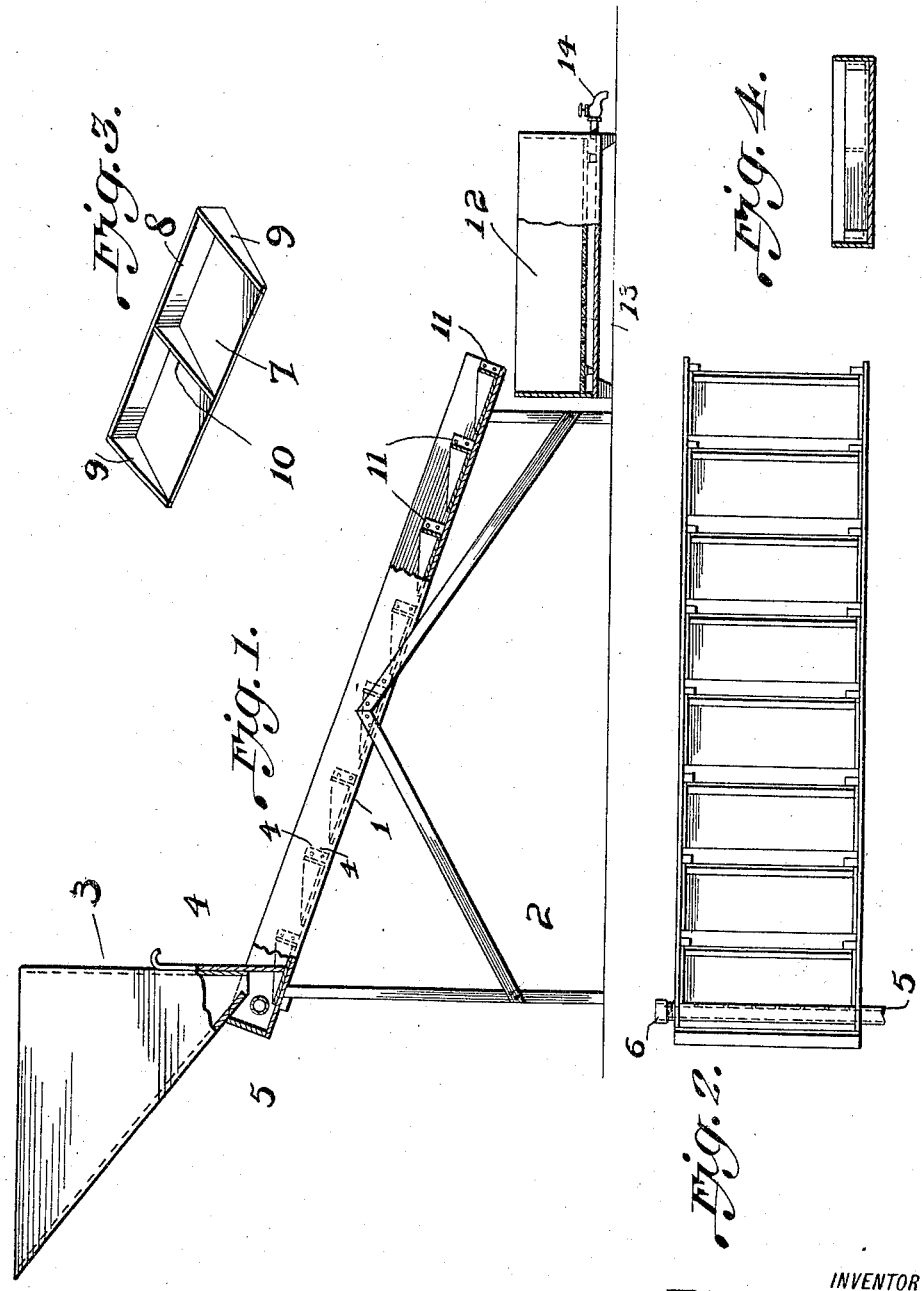
INVENTOR
Elmer H. Harry
BY
ATTORNEYS

UNITED STATES PATENT OFFICE.

ELMER HARKNESS HARRY, OF GIBSON CITY, ILLINOIS, ASSIGNOR OF ONE-HALF TO GALE WHITEHEAD, OF GIBSON CITY, ILLINOIS.

CLEANING DEVICE.

1,299,181.      Specification of Letters Patent.      Patented Apr. 1, 1919.

Application filed December 2, 1918. Serial No. 265,065.

*To all whom it may concern:*

Be it known that I, ELMER HARKNESS HARRY, a citizen of the United States, and a resident of Gibson City, in the county of Ford and State of Illinois, have invented a certain new and useful Improvement in Cleaning Devices, of which the following is a specification.

My invention is an improvement in cleaning devices, and has for its object to provide a device of the character specified for removing stones, gravel, sand, dirt and the like from beans and other similar vegetables.

In the drawings:—

Figure 1 is a side view of the improved device with parts in section,

Fig. 2 is a top plan view of the cleaning device,

Fig. 3 is a perspective view of one of the trays, and

Fig. 4 is a section on the line 4—4 of Fig. 1.

In the present embodiment of the invention, a suitable trough 1 is provided composed of a bottom wall, side walls, and one end wall, the other end being open, and the trough is arranged in inclined position as shown, being supported by suitable frame-work indicated at 2. The arrangement is such that the closed end of the trough is higher than the open end, so that the beans or other material to be cleaned will roll down the trough under the force of gravity.

The beans are fed to the trough at its upper end, from a hopper 3, the said hopper being seated in the upper end of the trough and having an opening in its bottom at the front wall through which the beans are discharged. A gate or valve 4 is mounted to slide on the front wall of the hopper, that is, adjacent to the trough, the said wall being perpendicular and by means of this gate or valve, the flow of the beans may be regulated.

A pipe 5 is arranged transversely of the trough below and behind the delivery opening of the hopper, and the said pipe is adapted for connection at one end with a series of water supply pipes, the other end being closed by a cap 6 as shown. The pipe has radial openings through which the water is discharged onto the beans as the beans are fed from the hopper.

Within the trough is arranged a series of trays, each consisting of a bottom 7, one side wall 8, end walls 9, and a transverse partition wall 10. The end walls 9 and the partition wall 10 are sloped or inclined toward the open side of the tray, and a series of trays is seated in the trough. The side walls of the trough have angle plates 11 against which the trays seat, and the trays may be easily removed from the partition or replaced therein.

The partition delivers at its lower end to a suitable box-like casing 12, the said casing being supported below the lower end of the trough in such position that the beans and the water will be delivered therein. A false bottom 13 of perforate material is supported in the casing above the true bottom, and a discharge faucet is provided between the false bottom and the true bottom for permitting the water to be drawn off from the casing.

In operation the beans or other material to be cleaned is fed to the hopper 3, the flow of the beans from the hopper being regulated by the gate 4. As the beans pass from the hopper, streams of water play upon them from the pipe 5, and they are thoroughly washed by the said stream.

Thus sand, gravel and the like being of greater specific gravity than the beans, is carried off by the water will settle in the trays against the lower side wall, which side walls constitute in effect riffles for catching the sand, gravel and the like, while the beans carried by the water flow on downward into the tank or casing 12, while the water passes through the delivery bottom and is drawn off, the beans remaining on the bottom.

I claim:—

A device of the character specified comprising an inclined trough having an unbroken plane surface, a feed hopper at the high end, a separating tank at the low end, means for supplying water to the trough above and behind the feed hopper, means in connection with the feed hopper for varying the rate of feed, and riffles secured transversely to the bottom of the trough, each riffle being in the form of a tray having the bottom lying flat upon the bottom of the trough and connected to the trough and having an upstanding front wall, and end walls inclining from the front wall to the bottom.

ELMER HARKNESS HARRY.

Copies of this patent may be obtained for five cents each, by addressing the "Commissioner of Patents, Washington, D. C."